(12) United States Patent
Zhang et al.

(10) Patent No.: US 8,315,155 B2
(45) Date of Patent: Nov. 20, 2012

(54) METHOD, SYSTEM AND BOARD APPARATUS FOR IMPLEMENTING AUTOMATIC PROTECTION SWITCHING BETWEEN ACTIVE BOARD AND STANDBY BOARD

(75) Inventors: Yaowen Zhang, Shenzhen (CN); Guojun Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 214 days.

(21) Appl. No.: 12/826,496

(22) Filed: Jun. 29, 2010

(65) Prior Publication Data

US 2010/0266274 A1  Oct. 21, 2010

Related U.S. Application Data

(63) Continuation of application No. PCT/CN2008/072234, filed on Sep. 2, 2008.

(30) Foreign Application Priority Data

Dec. 29, 2007 (CN) .......................... 2007 1 0094690

(51) Int. Cl.
*H04L 1/00* (2006.01)
(52) U.S. Cl. ......... 370/216; 370/241; 370/217; 370/341
(58) Field of Classification Search .................. None
See application file for complete search history.

(56) References Cited

U.S. PATENT DOCUMENTS

| 5,867,484 A * | 2/1999 | Shaunfield | 370/395.51 |
| 6,625,115 B1 * | 9/2003 | Ikeda et al. | 370/217 |
| 7,872,967 B2 * | 1/2011 | Chun et al. | 370/228 |
| 2003/0076857 A1 * | 4/2003 | Morita et al. | 370/466 |
| 2005/0058064 A1 * | 3/2005 | Phelps et al. | 370/225 |
| 2007/0081451 A1 * | 4/2007 | Fujimori et al. | 370/227 |
| 2007/0280103 A1 * | 12/2007 | Savage et al. | 370/228 |
| 2008/0316920 A1 * | 12/2008 | Chun et al. | 370/225 |
| 2010/0266274 A1 | 10/2010 | Zhang et al. | |

FOREIGN PATENT DOCUMENTS

| CN | 1378353 A | 11/2002 |
| CN | 1434574 A | 8/2003 |
| CN | 1581716 A | 2/2005 |
| CN | 1913399 A | 2/2007 |
| CN | 101197634 A | 6/2008 |
| JP | 10-303870 A | 11/1998 |
| WO | WO 03/063522 A1 | 7/2003 |

OTHER PUBLICATIONS

English Translation of the Written Opinion of the International Searching Authority, PCT/CN2008/072234, Date of mailing Nov. 27, 2008, 4 pages.

Chinese Office Action, Application No. 200710094690.1, Dated May 27, 2010, 7 pages.

International Search Report, PCT/CN2008/072234, Date of mailing Nov. 27, 2008, 6 pages.

* cited by examiner

*Primary Examiner* — Hassan Phillips
*Assistant Examiner* — Ajay Cattungal
(74) *Attorney, Agent, or Firm* — Slater & Matsil, L.L.P.

(57) ABSTRACT

A method for implementing Automatic Protection Switching (APS) between an active board and a standby board includes detecting Synchronous Digital Hierarchy (SDH) data of main services, wherein the SDH data is received by a working port of the active board from a working line. If the SDH data received by the working port is detected as abnormal, SDH data of main services received by a protection port of the standby board is selected from a protection line, and service processing is performed for the SDH data.

17 Claims, 5 Drawing Sheets

METHOD, SYSTEM AND BOARD APPARATUS FOR IMPLEMENTING AUTOMATIC PROTECTION SWITCHING BETWEEN ACTIVE BOARD AND STANDBY BOARD

This application is a continuation of co-pending International Application No. PCT/CN2008/072234, filed on Sep. 2, 2008, which designated the United States and was not published in English, and which claims priority to Chinese Application No. 200710094690.1, filed on Dec. 29, 2007, both of which applications are incorporated herein by reference.

TECHNICAL FIELD

The present invention relates to Synchronous Digital Hierarchy (SDH) network technologies, and in particular, to a method, system and board apparatus for implementing Automatic Protection Switching (APS) between an active board and a standby board in an SDH network.

BACKGROUND

Self healing is one of the prominent features of an SDH network. Self healing means that when the network fails (for example, the fiber is cut), the network discovers a substitute transmission route automatically in a very short time (within 50 ms, as specified by the International Telecommunication Union-Telecommunication Standardization Sector (ITU-T)), and sets up communications again through the substitute transmission route. In this way, the service recovers from the failure automatically, and the user hardly perceives the network failure. The substitute route may use a standby device or use redundancy capabilities of an existing device to recover all services or the services of a specified priority.

The self healing function of the SDH network is implemented through APS. In the existing application, APS is implemented through two system configurations, namely, (1) an interface board, a main control board, and a cross-connect board are configured in the system, and the main control board implements APS protocol processing; or (2) only an interface board and a cross-connect board are configured in the system, and the cross-connect board implements the APS protocol processing. In the foregoing application solution, APS needs to be implemented through a main control board or cross-connect board. Nowadays, the modern communication technologies are developing rapidly, and more and more communication devices need to access an optical network for transmitting services. Most of such devices lack a dedicated main control board or cross-connect board, and are unable to implement APS of optical interfaces based on the foregoing solution.

On the other hand, for most of the communication devices that need to access the optical network, an active board and a standby board coexist. Based on that, an APS solution based on the active board and the standby board is provided in the prior art. In this solution, after a line failure is detected, complete switchover occurs between the active board and the standby board, and complete switchover involves not only port switching but also switching of service processing. In the switchover process, plenty of last words and service information need to be processed. Therefore, the switchover is slow (the switchover time is generally more than one second) in this solution.

SUMMARY OF THE INVENTION

The embodiments of the present invention provide a method, system, and board apparatus for implementing APS between an active board and a standby board to improve the speed of APS between the active board and the standby board.

Embodiments of the present invention are implemented through the following technical solutions.

A method for implementing APS between an active board and a standby board includes detecting SDH data of main services. The SDH data is received by a working port of the active board from a working line. If the SDH data received by the working port is detected as abnormal, SDH data of main services received by a protection port of the standby board from a protection line is selected. Service processing is performed for the SDH data.

A board apparatus includes an SDH processing module that is configured to detect SDH data of main services received from a working line. If the SDH data received from the working line is detected as abnormal, SDH data of main services received from a protection line for outputting is selected. A service processing module is configured to perform service processing for the SDH data output by the SDH processing module.

A board apparatus includes an SDH processing module. The SDH processing module includes a protection port that is configured to receive SDH data of main services from a protection line and output the data. A cross-connect module is configured to configure a cross-connect matrix and forward the SDH data output by the protection port to an active board according to the configured cross-connect matrix.

A system for implementing APS between an active board and a standby board includes the active board and the standby board.

The active board includes a first SDH processing module that is configured to detect SDH data of main services received from a working line. If the SDH data received from the working line is detected as abnormal, SDH data of main services received from a protection line is selected for outputting. A service processing module is configured to perform service processing for the SDH data output by the SDH processing module.

The standby board includes a second SDH processing module. The second SDH processing module includes a protection port that is configured to receive SDH data of main services from a protection line and output the data. A cross-connect module is configured to configure a cross-connect matrix and forward the SDH data output by the protection port to an active board according to the configured cross-connect matrix.

In technical solutions under embodiments of the present invention, the APS between the active board and the standby board involves only port switching without switching of service processing. Therefore, it is not necessary to process plenty of last words or service information in the switching process. Compared with the prior art, embodiments of the present invention improve the speed of APS between the active board and the standby board.

DETAILED DESCRIPTION OF ILLUSTRATIVE EMBODIMENTS

The exemplary embodiments of the method, system, and board apparatus for implementing port APS between an active board and a standby board under the present invention are detailed below with reference to accompanying drawings.

Figure 1:
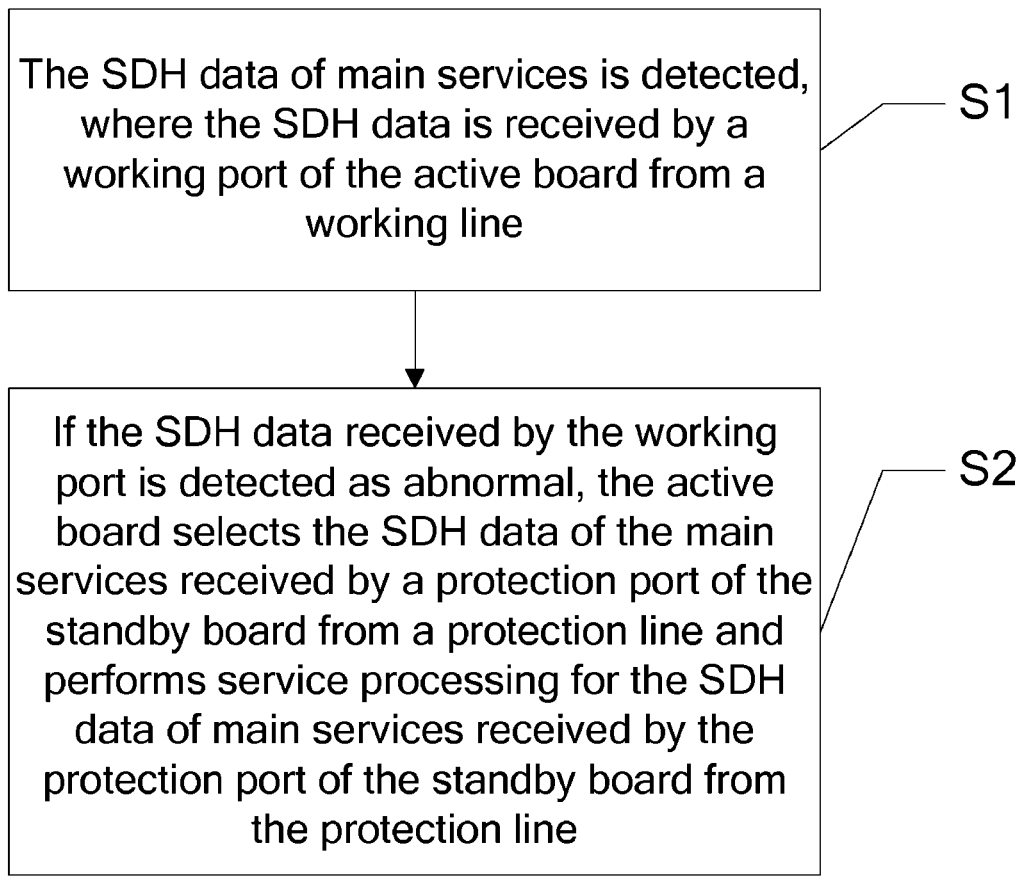
FIG. 1 is a flowchart of a first embodiment of a method for implementing APS between an active board and a standby board according to the present invention.

As shown in FIG. 1, a basic process of a method for implementing APS between an active board and a standby board in the first embodiment of the present invention includes the following steps.

S1. The SDH data of main services is detected. The SDH data is received by a working port of the active board from a working line.

S2. If the SDH data received by the working port is detected as abnormal, the active board selects the SDH data of the main services received by a protection port of the standby board from a protection line and performs service processing for the SDH data of main services received by a protection port of the standby board from a protection line.

If the K byte in the SDH data frame includes alarm information indicative of Signal Failure (SF) or Signal Degrade (SD), the SDH data is abnormal.

The protection port may be a protection port corresponding to the working port with abnormal data, or all protection ports of the local standby board.

Normally in this embodiment, the working line transmits the SDH data of the main services, and the protection line transmits the services that are the same as those on the working line, or the protection line transmits the SDH data of additional services of a low priority.

In this embodiment, the APS between the active board and the standby board involves only port switching without switching of service processing. Therefore, it is not necessary to process plenty of last words or service information in the switching process. Compared with the prior art, this embodiment improves the speed of APS between the active board and the standby board.

Figure 2:
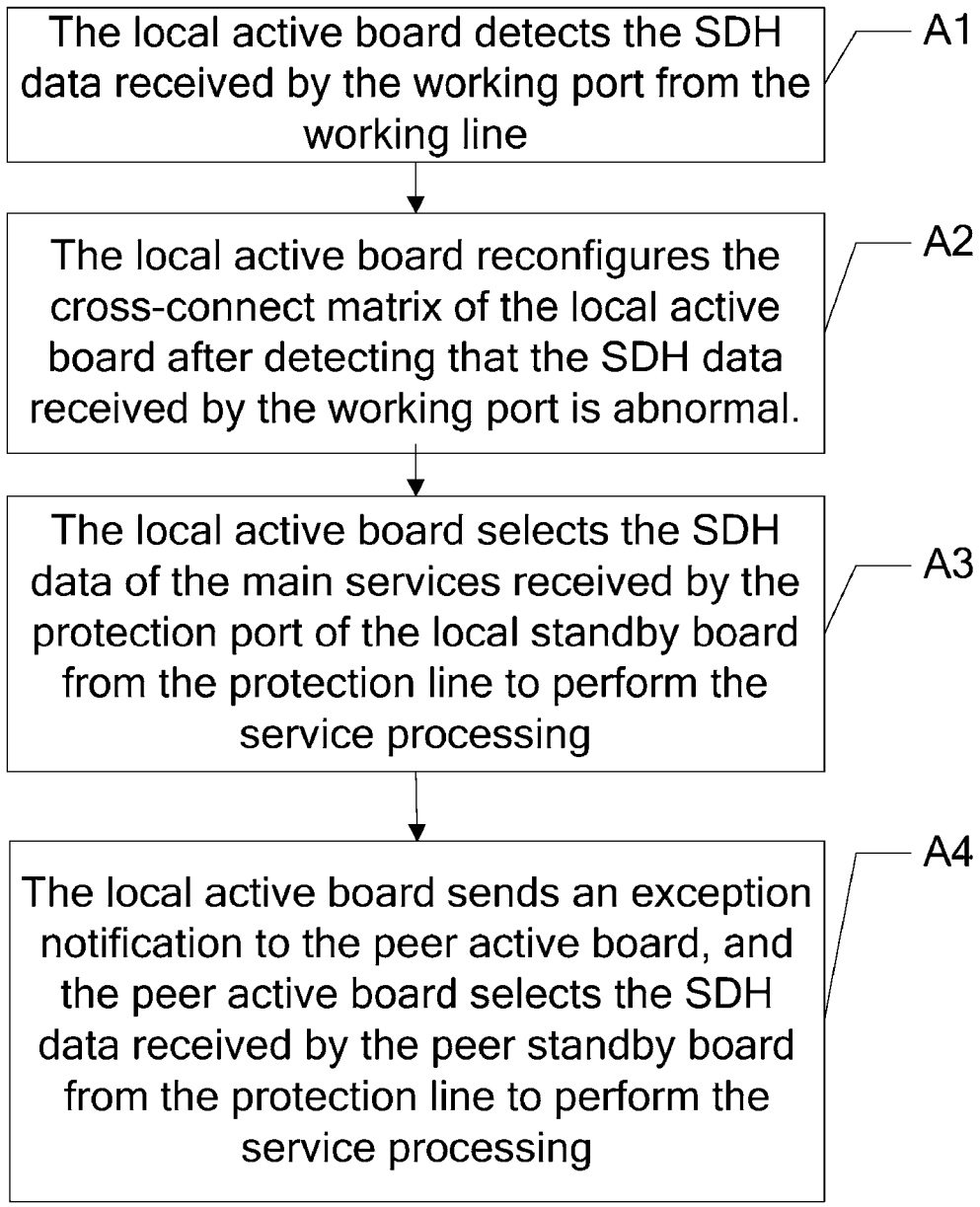
FIG. 2 is a flowchart of a second embodiment of a method for implementing APS between an active board and a standby board according to the present invention.

The second embodiment of the method for implementing APS between an active board and a standby board is applicable to a system configured as 1+1 linear Multiplex Section (MS) protection. The 1+1 linear MS protection means that both the working line and the protection line transmit main services in any circumstances. As shown in FIG. 2, the method in this embodiment includes the following steps.

A1. The local active board detects the SDH data received by the working port from the working line.

A2. The local active board reconfigures the cross-connect matrix of the board after detecting that the SDH data received by the working port is abnormal. After the reconfiguration, the local active board can select the SDH data received by the local standby board from the protection line.

A3. According to the configuration of the cross-connect matrix of the local active board, the local active board selects the SDH data of the main services received by the protection port of the local standby board from the protection line to perform the service processing.

Normally, the local active board selects the SDH data received by the working port of the board from the working line to perform the service processing. After detecting that the SDH data received by the working port is abnormal, the local active board selects the SDH data of the main services received by the local standby board from the protection line to perform the service processing.

In this embodiment, the cross-connect matrix of the local standby board may be configured fixedly to forward the SDH data received from the protection line to the local active board. In this case, the local standby board always forwards the SDH data received from the protection line to the local active board.

If the cross-connect matrix of the local standby board is not configured fixedly in that way, after detecting that the SDH data received by the working port is abnormal, the local active board may send a port switching request to the standby board. According to this request, the local standby board may configure the cross-connect matrix of the local standby board and forward the SDH data received from the protection line to the local active board.

A4. The local active board sends an exception notification to the peer active board. The peer active board selects the SDH data received by the peer standby board from the protection line to perform the service processing.

In this embodiment, after detecting that the received data is abnormal, the local active board and the local standby board still keep sending SDH data of the main services on the protection line in the sending direction of the local board; and the peer active board and the peer standby board still keep sending SDH data of the main services on the protection line in the sending direction of the peer board.

In this embodiment, the SDH data received from the protection line may be forwarded to the local active board through an Extended SDH Serial Interface (ESSI) bus.

The third embodiment gives a detailed implementation mode of the second embodiment. The method for implementing APS between an active board and a standby board in the third embodiment includes the following steps.

C1. The local active board detects the SDH data received by the working port from the working line.

C2. If the receiving line detection module of the local active board detects that the K byte of an SDH data frame received by a working port includes abnormal information such as an SF or SD alarm, the receiving line detection module sets the K byte in the SDH data multiplex section to indicate the abnormal information, and then sends the set SDH data to the APS protocol processing unit of the board.

C3. After receiving the SDH data, the APS protocol processing unit of the local active board judges whether the abnormal information indicated by the K byte in the SDH data multiplex section is a preset APS cause. If the abnormal information is a preset APS cause, the APS protocol processing unit determines that APS is required, and then generates the cross-connect configuration information and sends it to the cross-connect module of the local active board.

C4. The cross-connect module of the local active board reconfigures cross-connect matrix of the local active board according to the cross-connect configuration information. After the reconfiguration, the local active board can select the SDH data received by the local standby board from the protection line.

C5. According to the configuration of the cross-connect matrix of the local active board, the cross-connect module of the local active board selects the SDH data received by the local standby board from the protection line to perform the service processing.

In this embodiment, the cross-connect matrix of the local standby board may be configured fixedly to forward the SDH data received from the protection line to the local active board. In this way, the cross-connect module of the local standby board always forwards the SDH data received from the protection line to the local active board.

If the cross-connect matrix of the local standby board is not configured fixedly in the above way, after the receiving line detection module of the local active board detects that the SDH data received by the working port is abnormal, the APS protocol processing unit of the local active board may send a port switching request to the APS protocol processing unit of the local standby board. According to this request, the APS protocol processing unit of the local standby board may generate the cross-connect configuration information, and then send the cross-connect configuration information to the cross-connect module of the board. According to the cross-connect configuration information, the cross-connect module reconfigures cross-connect matrix of the local standby board. As a result of the reconfiguration, the SDH data received by the standby board from the protection line is forwarded to the local active board, and the local active board can select the SDH data received by the local standby board from the protection line to perform the service processing.

In this embodiment, the SDH data received by the local standby board from the protection line may be forwarded to the local active board through an ESSI bus.

Figure 3:
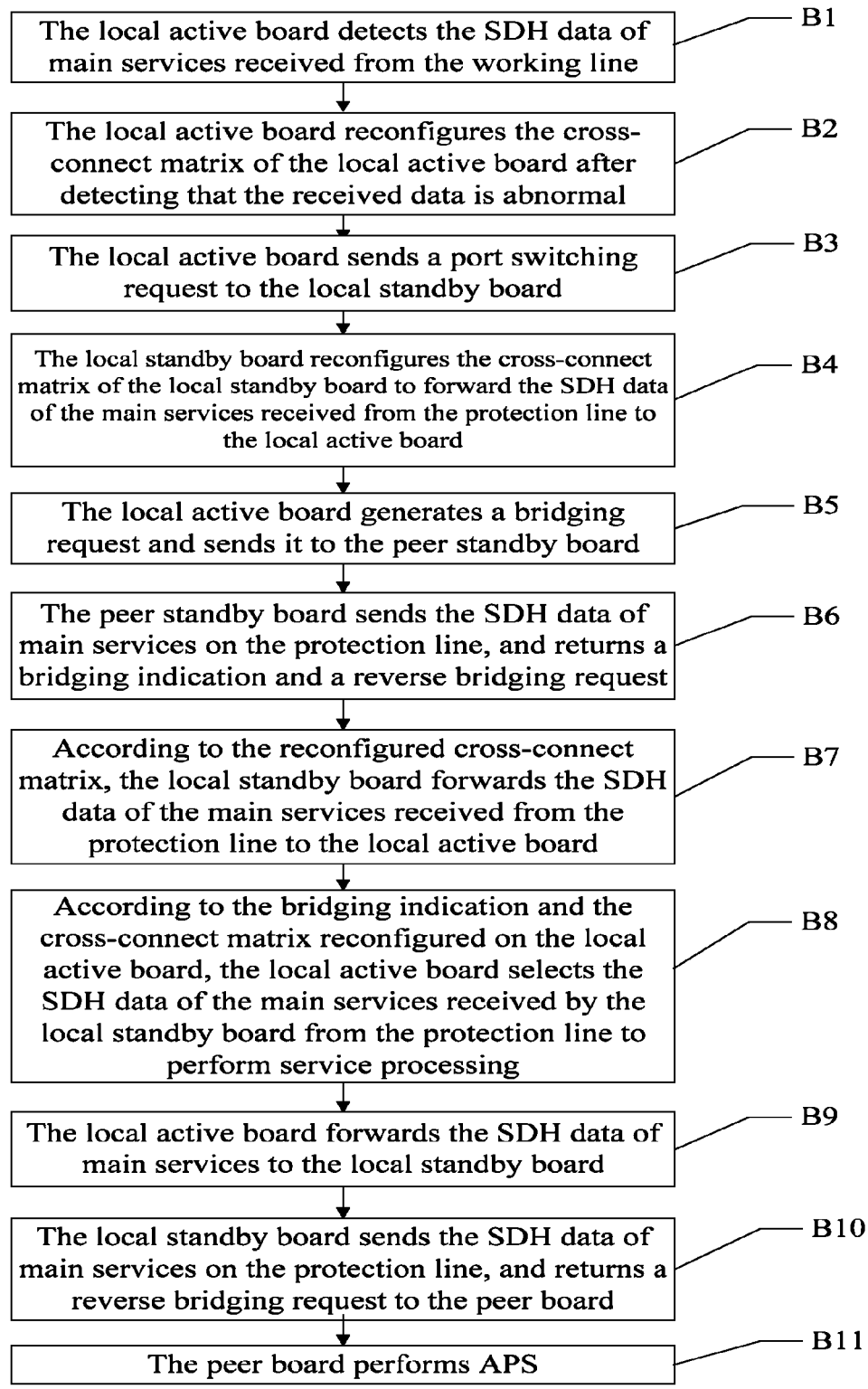
FIG. 3 is a flowchart of a fourth embodiment of a method for implementing APS between an active board and a standby board according to the present invention.

The fourth embodiment of the method for implementing APS between an active board and a standby board is applicable to a system configured as 1:1 linear MS protection. 1:1 linear MS protection means that the working line normally transmits main services and the protection line transmits additional services but when the working line fails, the protection line stops transmitting the additional services, and transmits the main services instead. As shown in FIG. 3, the method in this embodiment includes the following steps.

B1. The local active board detects the SDH data of main services received by the working port from the working line.

B2-B3. The local active board reconfigures the cross-connect matrix of the local active board after detecting that the SDH data received by the working port is abnormal. After the reconfiguration, the local active board can select the SDH data received by the local standby board from the protection line, and the local active board sends a port switching request to the local standby board.

If the receiving line detection module of the local active board detects that the K byte of an SDH data frame received by a working port includes abnormal information such as an SF or SD alarm, the receiving line detection module sets the K byte in the SDH data multiplex section to indicate the abnormal information, and then sends the set SDH data to the APS protocol processing unit of the local active board.

After receiving the SDH data, the APS protocol processing unit of the local active board judges whether the abnormal information indicated by the K byte in the SDH data multiplex section is a preset APS cause. If the abnormal information is a preset APS cause, the APS protocol processing unit of the local active board determines that APS is required, and then generates the cross-connect configuration information and sends the cross-connect configuration information to the cross-connect module of the board; according to the cross-connect configuration information, the cross-connect module reconfigures the cross-connect matrix of the local active board. After the reconfiguration, the local active board can select the SDH data received by the local standby board from the protection line. Meanwhile, the APS protocol processing unit of the local active board sends a port switching request to the APS protocol processing unit of the local standby board.

B4. According to the port switching request, the local standby board reconfigures its cross-connect matrix to forward the SDH data of the main services received from the protection line to the local active board.

B5-B6. The local active board generates a bridging request and sends it to the peer standby board through the protection line. According to the bridging request, the peer standby board sends the SDH data of the main services on the protection line, and returns a bridging indication and a reverse bridging request.

After determining that the APS is required, the APS protocol processing unit of the local active board sends the K byte to a framer of the local active board. The framer combines the system interface data to be sent with the K byte into an SDH frame, and sends the SDH frame to the local standby board through an ESSI bus. The local standby board sends the SDH frame to the peer board through the protection line.

After receiving the port switching request sent by the APS protocol processing unit of the local active board, the APS protocol processing unit of the local standby board generates the cross-connect configuration information according to the port switching request, and sends the cross-connect configuration information to the cross-connect module of the local standby board. According to the cross-connect configuration information, the cross-connect module reconfigures the cross-connect matrix of the local standby board to forward the SDH data received from the protection line to the local active board.

B7-B8. According to the configuration of the cross-connect matrix of the local standby board, the local standby board forwards the SDH data of the main services received from the protection line to the local active board. According to the bridging indication and the configuration of the cross-connect matrix of the board, the local active board selects the SDH data of the main services received by the local standby board from the protection line to perform the service processing.

According to the configuration of the cross-connect matrix of the local standby board, the cross-connect module of the local standby board forwards the SDH data of the main services received by the protection port from the protection line to the local active board through an ESSI bus. According to the bridging indication and the configuration of the cross-connect matrix of the board, the cross-connect module of the local active board selects the SDH data received through the ESSI bus to perform the service processing.

B9-B10. According to the reverse bridging request, the local active board forwards the SDH data of the main services to the local standby board. The local standby board sends the SDH data of the main services on the protection line, and returns a reverse bridging indication to the peer board.

B11. According to the reverse bridging indication, the peer board performs APS, and receives the SDH data of the main services from the protection line.

The fifth embodiment of the method for implementing APS between an active board and a standby board is similar to the second or third embodiment, and is also applicable to a system configured as 1+1 linear MS protection. The difference is that in the fifth embodiment, APS recovery is performed after it is detected that the SDH data received by the working port with abnormal data recovers to normal. Specifically, after the local active board selects the SDH data of the main services received by the local standby board from the protection line to perform the service processing, the method further includes the following steps.

D1. The local active board detects the SDH data received by the working port with abnormal data from the working line.

D2. If it is detected that the SDH data received by the working port recovers to normal, the local active board sends a wait-to-restore request to the peer board, and starts to count wait-to-restore time.

D3. If the SDH data received by the working port is always normal within a preset wait-to-restore period, the cross-connect matrix of the local active board is reconfigured. According to the configuration of the cross-connect matrix of the local active board, the local active board selects the SDH data received by the working port from the working line to perform service processing.

The wait-to-restore period may be set to 5-12 minutes.

The sixth embodiment of the method for implementing APS between an active board and a standby board is similar to the fourth embodiment, and is also applicable to a system configured as 1:1 linear MS protection. The difference is that in the sixth embodiment, APS recovery is performed after it is detected that the SDH data received by the working port with abnormal data recovers to normal. Specifically, after the local active board selects the SDH data of the main services received by the local standby board from the protection line to perform the service processing, the method further includes the following steps.

E1. The local active board detects the SDH data received by the working port with abnormal data from the working line.

E2. If it is detected that the SDH data received by the working port recovers to normal, the local active board sends a wait-to-restore request to the peer board, and starts to count wait-to-restore time.

E3. If the SDH data received by the working port is always normal within a preset wait-to-restore period, the local active board sends a request for stopping bridging of main services to the peer board, and reconfigures the cross-connect matrix of the local active board.

The wait-to-restore period may be set to 5-12 minutes.

E4. According to the configuration of the cross-connect matrix of the local active board, the local active board selects the SDH data received by the working port from the working line to perform service processing.

E5. According to the request for stopping bridging of main services, the peer board stops line bridging, releases the protection line, and stops sending main services on the protection line. The peer active board reconfigures its cross-connect matrix, and selects the SDH data received by the working port of the peer active board from the working line to perform service processing. Moreover, the peer board sends a request for stopping bridging of main services to the local active board.

E6. According to the request for stopping bridging of main services from the peer board, the local active board stops bridging and releases the protection line, and the local standby board stops sending main services on the protection line.

Figure 4:
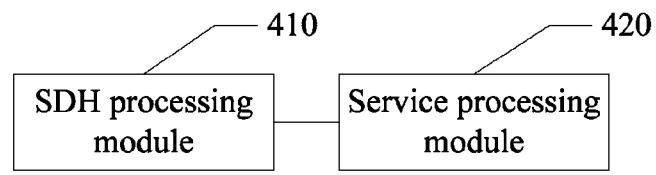
FIG. 4 shows a structure of a first embodiment of a board apparatus according to the present invention.

As shown in FIG. 4, a board apparatus provided in the first embodiment of the present invention includes an SDH processing module 410 that is configured to detect SDH data of main services received from a working line, and if the SDH data received from the working line is detected as abnormal, select SDH data of main services received from a protection line. A service processing module 420 is configured to perform service processing for the SDH data which is selected by the SDH processing module 410 and received by the protection port from the protection line.

Figure 5:
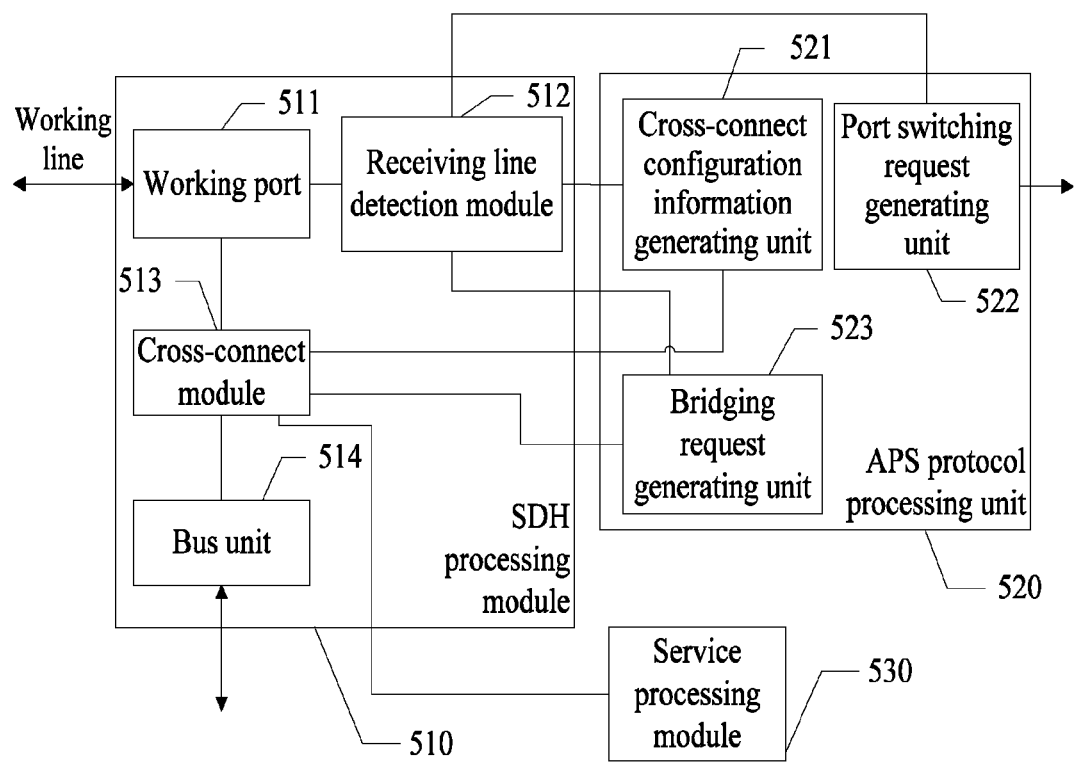
FIG. 5 shows a structure of a second embodiment of a board apparatus according to the present invention.

As shown in FIG. 5, a board apparatus provided in the second embodiment of the present invention includes an SDH processing module 510 is configured to detect SDH data of main services received from a working line and, if the SDH data received from the working line is detected as abnormal, select SDH data of main services received from a protection line. An APS protocol processing unit 520 includes a cross-connect configuration information generating unit 521 that is configured to generate and output cross-connect configuration information indicative of selecting the SDH data received from the protection line if it is detected that the SDH data is abnormal. A service processing module 530 is configured to perform service processing for the SDH data output by the SDH processing module 510.

The SDH processing module 510 further includes a working port 511, a receiving line detection module 512, and a cross-connect module 513.

The working port 511 is configured to receive SDH data of main services from a working line.

The receiving line detection module 512 is configured to detect the SDH data of main services from a working line, and output a detection result indicative of a data exception after detecting that the data receiving line detection module is abnormal.

The cross-connect 513 is configured to reconfigure the cross-connect matrix according to the cross-connect configuration information output by the cross-connect configuration information generating unit 521, select the SDH data of main services received from the protection line for outputting according to the configuration of the cross-connect matrix, and send the SDH data to the service processing module 530.

In this embodiment, the APS protocol processing unit 520 further includes a port switching request generating unit 522, which is configured to generate a port switching request after it is detected that the SDH data is abnormal, and send the request to the standby board.

In this embodiment, the APS protocol processing unit 520 further includes a bridging request generating unit 523, which is configured to generate a bridging request after it is detected that the SDH data is abnormal, and send the request to the device board on the other side of the working line. In practice, the request may be forwarded by the cross-connect module 513 to the standby board of the board apparatus.

In this embodiment, the SDH processing module 510 further includes a bus unit 514, which is configured to split the high-speed SDH data sent by the standby board of the board apparatus through an ESSI bus into multiple low-speed SDH data, and send the low-speed SDH data to the cross-connect module 513.

Figure 6:
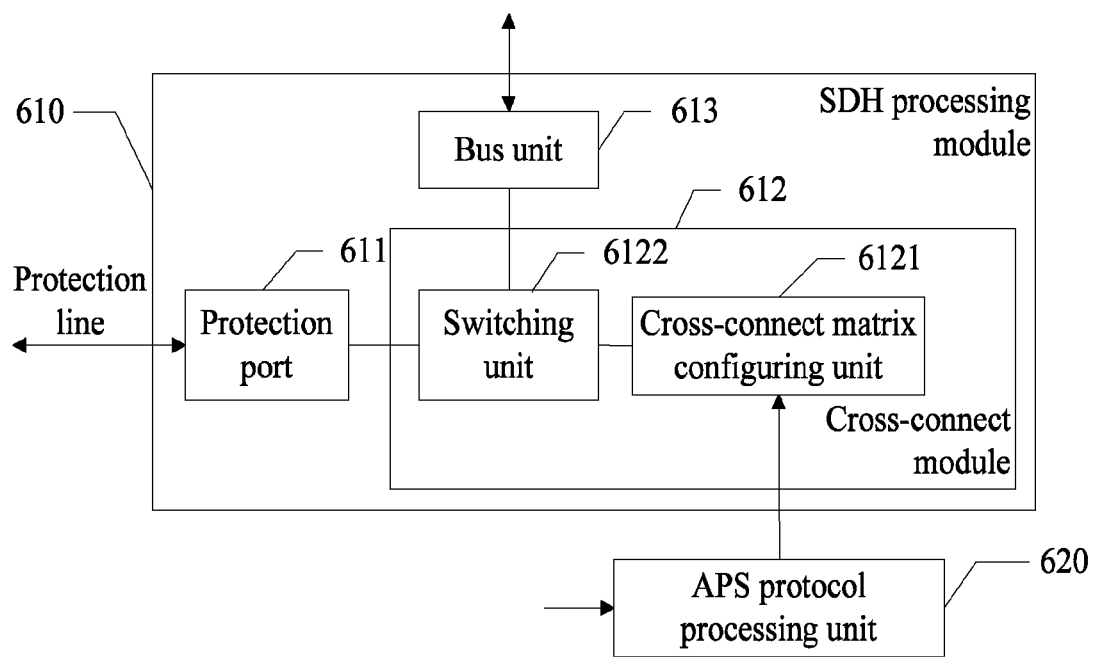
FIG. 6 shows a structure of a third embodiment of a board apparatus according to the present invention.

As shown in FIG. 6, a board apparatus provided in the third embodiment of the present invention includes an SDH processing module 610. The SDH processing module 610 includes a protection port 611 that is configured to receive SDH data of main services from a protection line and output the data. A cross-connect module 612 is configured to configure a cross-connect matrix and forward the SDH data output by the protection port 611 to an active board of the board apparatus according to the configured cross-connect matrix.

The board apparatus in this embodiment further includes an APS protocol processing unit 620, which is configured to receive a port switching request and generate cross-connect configuration information according to the port switching request and output the information. The cross-connect configuration information is an indication of configuring the cross-connect matrix to forward the SDH data received from the protection line to the active board of the board apparatus.

The cross-connect module 612 further includes a cross-connect matrix configuring unit 6121 that is configured to reconfigure the cross-connect matrix of the board apparatus according to the cross-connect configuration information. A switching unit 6122 is configured to forward the SDH data received from the protection line to the active board of the board apparatus according to the configuration of the cross-connect matrix.

The SDH processing module in this embodiment further includes a bus unit 613, which is configured to bundle the SDH data of main services output by the cross-connect module 612 into high-speed SDH data and forward the data to the active board of the board apparatus through an ESSI bus.

A system for implementing APS between an active board and a standby board is provided in an embodiment of the present invention. The system includes an active board and a standby board. The active board has the features of the board apparatus in the first or second embodiment of the present invention; and the standby board has the features of the board apparatus in the third embodiment of the present invention.

In the embodiments of the present invention, the APS between the active board and the standby board involves only port switching without switching of service processing. Therefore, it is not necessary to process plenty of last words or service information in the switching process. Compared with the prior art, the embodiments improve the speed of APS between the active board and the standby board.

In the embodiments of the present invention, data communications can be performed between the active board and the standby board through an ESSI bus. Therefore, multi-port bidirectional protection can be implemented through only two differential pairs, thus saving the bus resources of the standby board dramatically.

Detailed above are a method, system, and board apparatus for implementing APS between an active board and a standby board under the present invention. Although the invention is described through several exemplary embodiments, the invention is not limited to such embodiments. It is apparent that those skilled in the art can make modifications and variations to the invention without departing from the spirit and scope of the invention. The invention is intended to cover the modifications and variations provided that they fall within the scope of protection defined by the following claims or their equivalents.

What is claimed is:

1. A method for implementing Automatic Protection Switching (APS) between an active board and a standby board, the method comprising:
    detecting Synchronous Digital Hierarchy (SDH) data of main services received by a working port of the active board from a working line;
    selecting SDH data of main services received by a protection port of the standby board from a protection line, if the SDH data received by the working port is detected as abnormal data; and
    performing service processing for the SDH data of main services received by the protection port of the standby board from the protection line;
    wherein selecting the SDH data of the main services comprises selecting the SDH data of the main services received by the protection port of the standby board from the protection line if the standby board is configured to forward the SDH data of the main services received by the protection port from the protection line to the active board.

2. The method of claim 1, wherein a cross-connect matrix of the standby board is configured fixedly to forward the SDH data of the main services received by the protection port from the protection line to a cross-connect matrix of the active board.

3. The method of claim 1, wherein, if the active board sends a port switching request to the standby board, the cross-connect matrix of the standby board is configured to forward the SDH data of the main services received by the protection port from the protection line to the cross-connect matrix of the active board.

4. The method of claim 1, further comprising detecting that the SDH data received by the working port is abnormal by detecting whether abnormal information about the SDH data received by the working port is a preset APS cause, and determining the SDH data received by the working port is abnormal if the abnormal information is a preset APS cause.

5. The method of claim 1, further comprising, if it is detected that SDH data received by the working port with the abnormal data recovers to normal, selecting SDH data received by the working port of the active board from the working line to perform service processing.

6. The method of claim 1, wherein, before selecting the SDH data of the main services received by the protection port of the standby board, the method further comprises:
    sending a bridging request to a device board on the other side of the protection line;
    sending, by the device board on the other side of the protection line, SDH data of the main services on the protection line according to the bridging request;
    returning, by the device board on the other side of the protection line, a reverse bridging request to the standby board; and
    sending, by the standby board, SDH data of the main services on the protection line according to the reverse bridging request.

7. The method of claim 6, further comprising, if it is detected that SDH data received by the working port with the abnormal data recovers to normal, sending a request for stopping bridging of the main services to the device board on the other side of the protection line, and selecting SDH data received by the working port of the active board from the working line to perform service processing.

8. The method of claim 7, further comprising notifying the device board on the other side of the protection line to cancel bridging.

9. The method of claim 8, wherein notifying the device board on the other side of the protection line to cancel bridging comprises:
    sending a wait-to-restore request to the device board on the other side of the protection line and starting to count wait-to-restore time; and
    sending a request for stopping bridging of the main services to the device board on the other side of the protection line if SDH data received by the working port is normal within a preset wait-to-restore period.

10. The method of claim 1, wherein selecting the SDH data comprises selecting the SDH data of the main services received by the protection port of the standby board through an Extended SDH Serial Interface (ESSI) bus.

11. The method of claim 10, wherein the protection port comprises a protection port corresponding to the working port with the abnormal data, or all protection ports of the standby board.

12. A board apparatus, comprising:
    a Synchronous Digital Hierarchy (SDH) processing module configured to detect SDH data of main services received from a working line and, if the SDH data received from the working line is detected as abnormal, to select the SDH data of the main services received by the protection port of the standby board from the protection line if the standby board is configured to forward the SDH data of the main services received by the protection port from the protection line to the active board; and a service processing module configured to perform service processing for the SDH data which is selected by the SDH processing module.

13. The board apparatus of claim 12, further comprising an APS protocol processing unit, which comprises:

a cross-connect configuration information generating unit that is configured to reconfigure a cross-connect matrix of the board apparatus to select SDH data received by another board from the protection line if it is detected that abnormal information about the SDH data received by the working line is a preset APS cause; and a port switching request generating unit that is configured to generate a port switching request if it is detected that the SDH data of the main services from the working line is abnormal, and send the request to the another board.

14. The board apparatus of claim 13, wherein the SDH processing module comprises:

a working port configured to receive the SDH data of the main services from the working line;

a receiving line detection module configured to detect the SDH data of the main services from the working line, and output a detection result indicative of a data exception after detecting that the SDH data of the main services from the working line is abnormal; and a cross-connect module configured to reconfigure a cross-connect matrix of the board apparatus according to cross-connect configuration information output by the cross-connect configuration information generating unit.

15. The board apparatus of claim 13, wherein the APS protocol processing unit further comprises a bridging request generating unit that is configured to generate a bridging request if it is detected that the SDH data of the main services from the working line is abnormal, and send the request to a device board on the other side of the working line.

16. A board apparatus comprising a Synchronous Digital Hierarchy (SDH) processing module, the SDH processing module comprising:

a protection port configured to receive SDH data of main services from a protection line and output the SDH data;

a cross-connect module configured to configure a cross-connect matrix and forward the SDH data output by the protection port to another board according to the configured cross-connect matrix: and an APS protocol processing unit, configured to receive a port switching request, generate cross-connect matrix configuration information according to the port switching request, and output the cross-connect matrix configuration information to the cross-connect module;

wherein the cross-connect module further comprises:

a cross-connect matrix configuring unit configured to reconfigure the cross-connect matrix of the board apparatus; and a switching unit configured to forward the SDH data received by the protection port from the protection line to another board according to the reconfiguration of the cross-connect matrix.

17. The board apparatus of claim 16, wherein the SDH processing module further comprises a bus unit that is configured to forward the SDH data of the main services received by the protection port from the protection line to another board through an Extended SDH Serial Interface (ESSI) bus.

* * * * *